United States Patent
Marwaha et al.

(10) Patent No.: US 9,262,786 B1
(45) Date of Patent: Feb. 16, 2016

(54) CONFIGURING COMPOSITE RATEBOOKS

(71) Applicant: Guidewire Software, Inc., Foster City, CA (US)

(72) Inventors: Gaurav Marwaha, San Francisco, CA (US); Richard Ian Berlin, Campbell, CA (US); Douglas E. McCreary, Belmont, CA (US); Marilyn Joyce Schneider Hollinger, Millbrae, CA (US)

(73) Assignee: Guidewire Software, Inc., Foster City, CA (US)

( * ) Notice: Subject to any disclaimer, the term of this patent is extended or adjusted under 35 U.S.C. 154(b) by 0 days.

(21) Appl. No.: 13/755,978

(22) Filed: Jan. 31, 2013

(51) Int. Cl.
    *G06Q 40/08*    (2012.01)
(52) U.S. Cl.
    CPC .................... *G06Q 40/08* (2013.01)
(58) Field of Classification Search
    CPC .............. G06F 17/28; G06F 17/2872
    USPC ............................................. 705/4
    See application file for complete search history.

(56) References Cited

U.S. PATENT DOCUMENTS

| | | | | |
|---|---|---|---|---|
| 5,903,873 | A * | 5/1999 | Peterson et al. | 705/4 |
| 7,322,030 | B1 * | 1/2008 | Boodro et al. | 717/170 |

* cited by examiner

*Primary Examiner* — Lindsay M Maguire
(74) *Attorney, Agent, or Firm* — Van Pelt, Yi & James LLP

(57) ABSTRACT

Configuring composite ratebooks includes receiving configuration parameters associated with a composite ratebook; receiving a selection of one or more rate routines to be associated with the composite ratebook; receiving input defining one or more rate tables to be included in the composite ratebook; and generating a composite ratebook including the configuration parameters, the one or more rate routines, and the defined one or more rate tables. A rate routine includes operations used to determine a premium for an insurance coverage. The one or more rate tables include insurance factors used by the one or more selected rate routines to determine premiums for insurance coverages.

22 Claims, 11 Drawing Sheets

CONFIGURING COMPOSITE RATEBOOKS

BACKGROUND OF THE INVENTION

Insurance policy quoting is often carried out by enterprise scale software applications. Insurance policies can have various characteristics that may dictate the need for particular rating algorithms and rate tables. However, given the possible number of variations of different policies, finding the appropriate algorithms and tables to rate the policies can be difficult and time consuming. Additionally, integrating new rating algorithms into an insurance application can result in modifications to software code, which can result in system downtime and a negative impact on system users.

BRIEF DESCRIPTION OF THE DRAWINGS

Various embodiments of the invention are disclosed in the following detailed description and the accompanying drawings.

DETAILED DESCRIPTION

Figure 1:
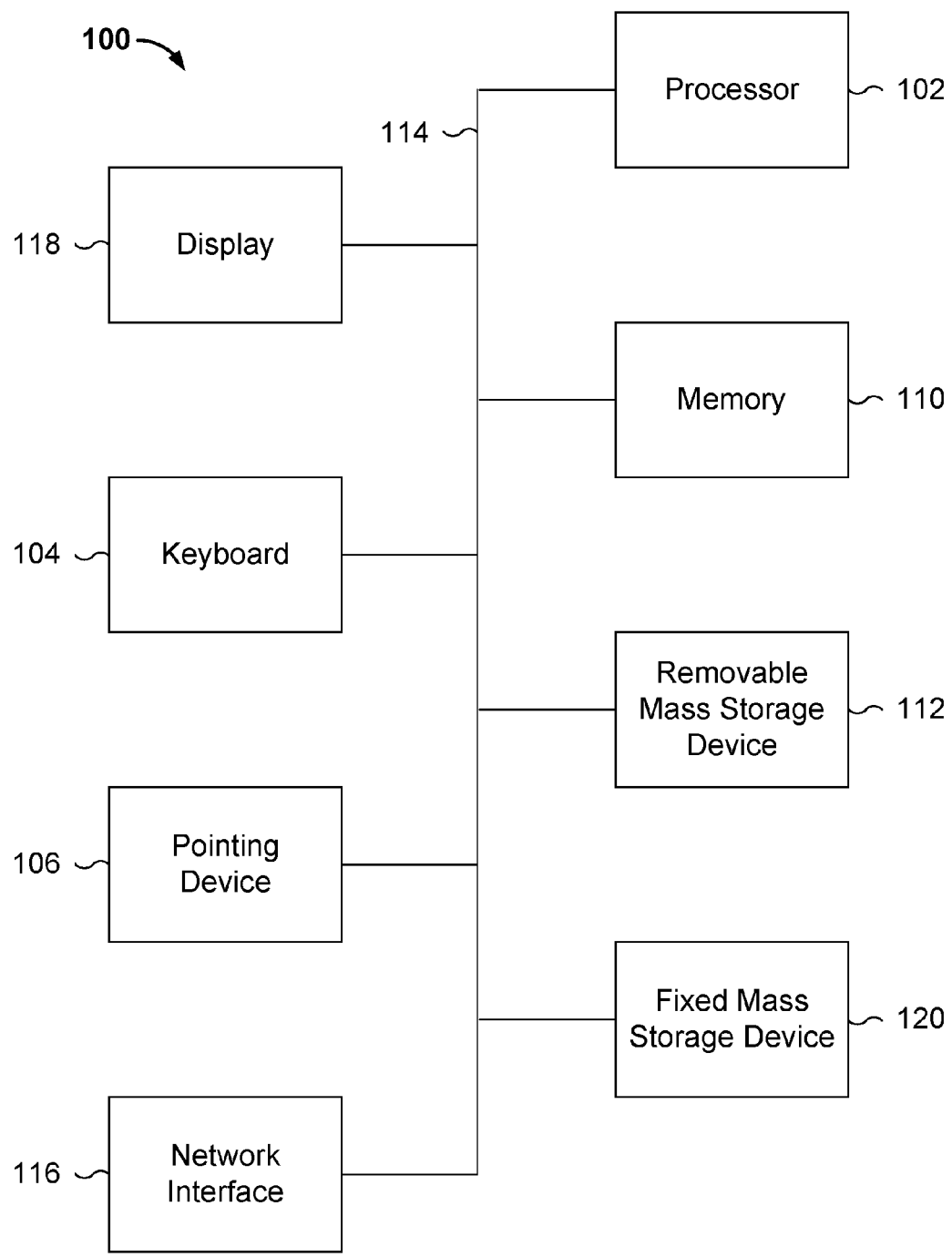
FIG. 1 is a functional diagram illustrating an embodiment of a programmed computer system for configuring composite ratebooks.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Configuring composite ratebooks is disclosed. As used herein, insurance ratebooks are collective groupings of rate routines and defined rate tables specified by a user such as an actuary, product manager, business analyst, underwriter, etc. In some embodiments, the rate routines are selected from a set of candidate rate routines. In some embodiments, parameters that specify the relevance and scope of a ratebook are also configured by a user. As used herein, a rate routine includes instructions that can be multi-step operations (e.g., mathematical computations, conditionals, etc.) that include operators (e.g., mathematical operators, assignment operators, etc.) and operands (e.g., numerical values, strings, Booleans, functions calls, table lookups, etc.) that when configured, specify the actions to be taken in order to calculate a premium for a coverage on an insurance policy. As used herein, rate tables are tables that include insurance factors and values that can be used by rate routines in determining coverage premiums. In some embodiments, coverages describe limits, deductibles, or other conditions for covering items on an insurance policy against loss or damage.

In some embodiments, insurance policies are quoted by matching an appropriate composite ratebook to the insurance policy, for example, based on an evaluation of the characteristics of an insurance policy and parameters of candidate ratebooks that the appropriate ratebook will be selected from. The rate routines and rate tables included in the matched ratebook can then be used to determine premiums for the various coverages included on the policy to be quoted.

FIG. 1 is a functional diagram illustrating an embodiment of a programmed computer system for configuring composite ratebooks. As will be apparent, other computer system architectures and configurations can be used to configure composite ratebooks. In this example, computer system 100, which includes various subsystems as described below, includes at least one microprocessor subsystem (also referred to as a processor or a central processing unit (CPU) 102). For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to configure composite ratebooks.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data, and objects used by the processor 102 to perform its functions (e.g., programmed instructions). For example, memory 110 can include any suitable computer-readable storage media described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage device 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storages 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a non-transitory computer readable medium that includes program code for performing various computer-implemented operations. The computer-readable medium is any data storage device that can store data which can thereafter be read by a computer system. Examples of non-transitory computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
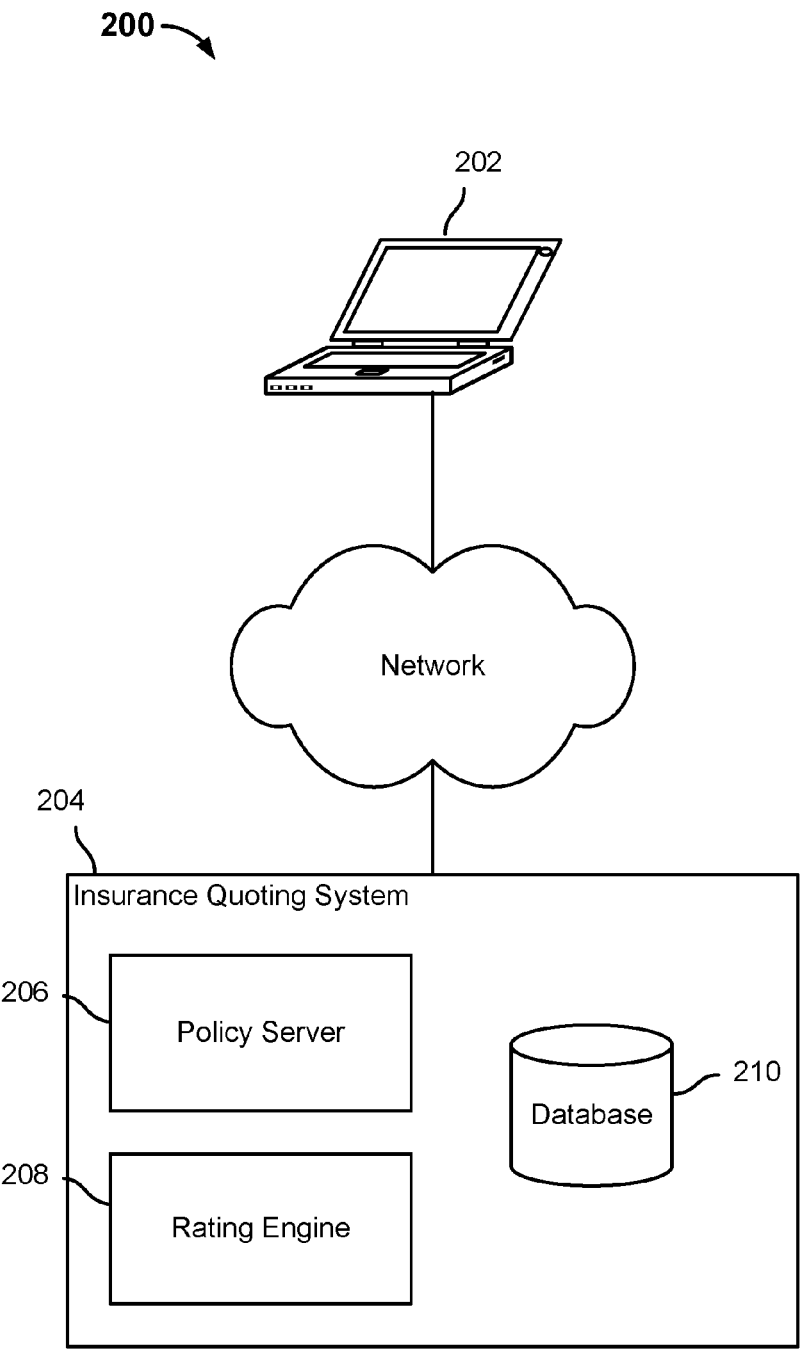
FIG. 2 is a system diagram illustrating an embodiment of a system for configuring composite ratebooks.

FIG. 2 is a system diagram illustrating an embodiment of a system for configuring composite ratebooks. In this example, a client device 202 of system 200 communicates with insurance quoting system 204 via a network. Examples of device 202 include a laptop computer, a desktop computer, a smart phone, a mobile device, a tablet device or any other computing device. As shown, device 202 is configured to communicate with the insurance quoting system, which includes policy server 206, rating engine 208, and database 210. In various embodiments, an application such as a web browser or a client application is installed at device 202 to enable communication with insurance quoting system 204. In this example, policy server 206 has logic for handling quotes for insurance policies, including generating policy offerings, receiving updates, obtaining quotes from rating engine 208, archiving policy quotes in database 210, etc. As shown, rating engine 208 has logic for generating quotes, configuring and archiving (e.g., in database 210) composite ratebooks and rate routines, etc. Other configurations are possible. For example, in some embodiments, the policy server and the rating engine are integrated within the same system. In some embodiments, the policy server and the rating engine are not integrated (e.g., are not operated by the same entities). In some embodiments, the policy server accesses multiple rating engines (e.g., rating engines operated by different insurance companies) to produce different quotes for different companies.

Figure 3:
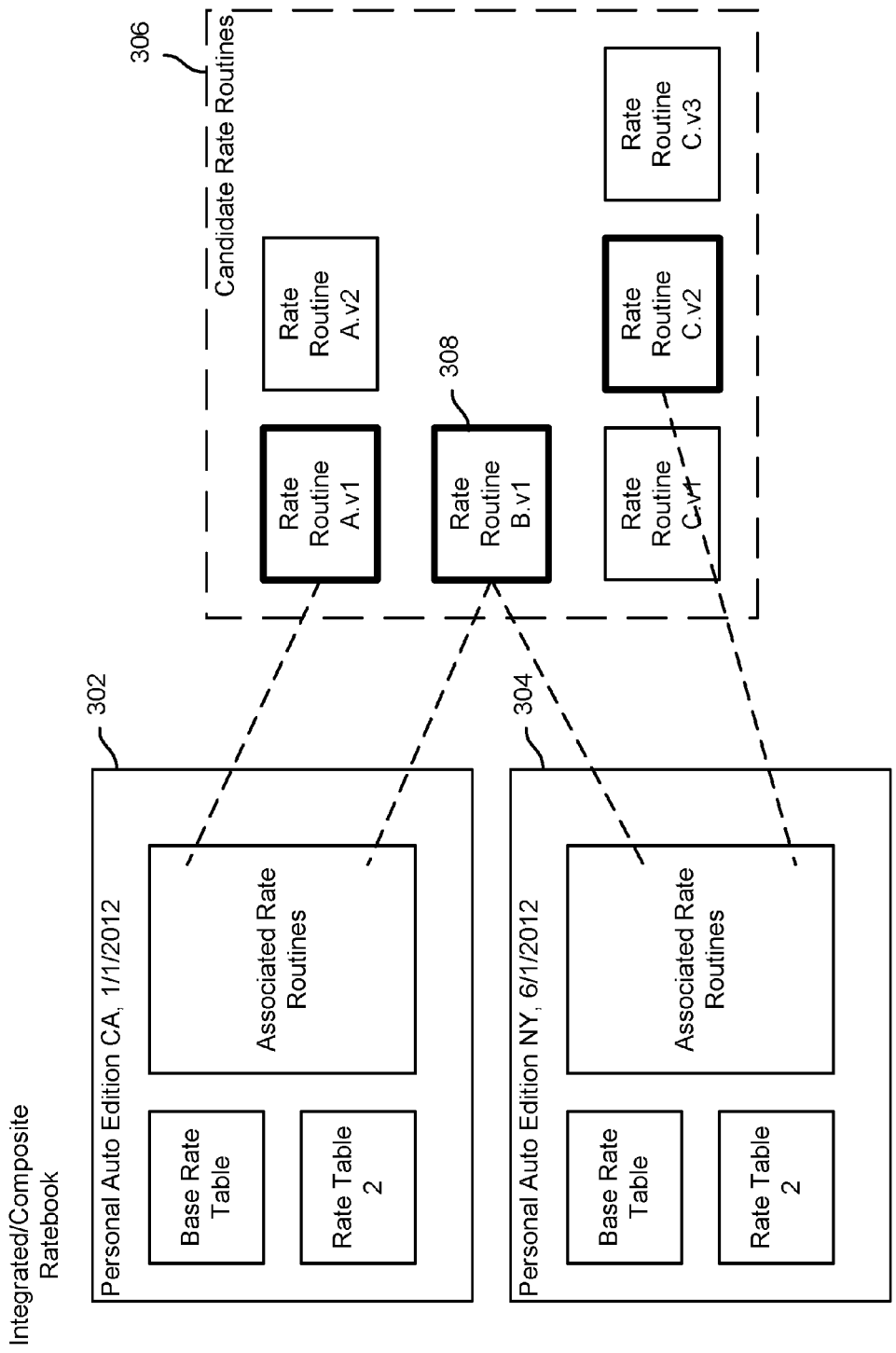
FIG. 3 is a diagram illustrating examples of composite ratebook data structures.

FIG. 3 is a diagram illustrating examples of composite ratebook data structures. In some embodiments, a composite ratebook is a data structure that is a collective grouping of rate routines and rate tables. In some embodiments, a user selects the rate routines and defines the rate tables that are included in a particular composite ratebook. A composite ratebook can be associated with particular characteristics and parameters, such that when a policy is to be quoted, an appropriate composite ratebook matching the characteristics of the policy to be quoted is selected from a pool of candidate composite ratebooks. The rate routines that are included in the selected composite ratebook are then used, in conjunction with the rate tables defined for the selected composite ratebook, to rate the coverages included in the policy to be quoted.

For example, ratebook 302 is a composite ratebook unit that groups rate routines and has defined rate tables that are applicable to personal auto policies in the state of California with an effective date of Jan. 1, 2012. Ratebook 304 is a composite ratebook unit that groups rate routines and has defined rate tables that are applicable to personal auto policies in the state of New York with an effective date of Jun. 1, 2012. In the event that a policy matching the criteria/parameters of state, line of business, effective date, or any other appropriate criteria/parameter is to be quoted, the appropriate composite ratebook, which already includes the appropriate rate routines and the defined rate table values, can be selected automatically to rate the policy.

Any combination of rate routines and defined rate tables can be included in generating/configuring a composite ratebook. In the example shown, ratebooks 302 and 304 are associated with different characteristics/parameters, different sets of rate routines, and separate defined rate tables which may have different values, however, in another example, the ratebooks could be different editions of the same ratebook, still associated with different characteristics/parameters and defined rate table values, but referencing identical rate routines.

As used herein, rate routines refer to operations with operators and operands that are configured and used to determine the cost (e.g., premium) of insurance coverages (e.g., death, disability, liability, etc.). In some embodiments, the rate routines to be included in or referenced by a particular composite ratebook unit are selected from a set of candidate rate routines, such as candidate rate routines 306, which includes pre-configured rate routines for rating insurance coverages. Various rate routines (and versions of rate routine types/classes) can be included in the set of candidate rate routines. In this example, three types of rate routines are shown (A, B, and C). Different types of rate routines can be specified according to various characteristics, such as a line of business (e.g., personal auto, commercial property, marine, etc.), the coverages for which a rate routine is applicable, jurisdiction, etc. The individual rate routines included in 306 are versions of the various types of rate routines, and in the example shown, their respective versions are indicated using an associated numeric subidentifier (e.g., v1, v2, etc.). Other subidentifiers of other types (e.g., string) are possible.

In some embodiments, there is a one-to-many relationship between rate routines and composite ratebooks, in which a single rate routine may be referenced by multiple composite ratebooks, as shown by rate routine 308, which is included as a part of both composite ratebooks 302 and 304. The rate routines can be configured independently of the ratebooks.

In some embodiments, for each composite ratebook, appropriate rate tables are defined. In some embodiments, rate tables are defined using rate table definitions. In some embodiments, rate table definitions describe the structure of rate tables. In some embodiments, rate tables are instances of rate table definitions that are populated with content. For example, in some embodiments, rate tables are configured to return appropriate insurance values and factors based on received insurance parameters associated with a policy. The insurance values and factors can then be passed to rate routines to calculate the cost/premium of various coverages on a policy to be quoted (e.g., as operands or parameters passed to the rate routines). In some embodiments, the rate tables are defined as instances for a particular composite ratebook. However, in some embodiments, the rate tables can also be shared, as will be described in more detail below.

Figure 4:
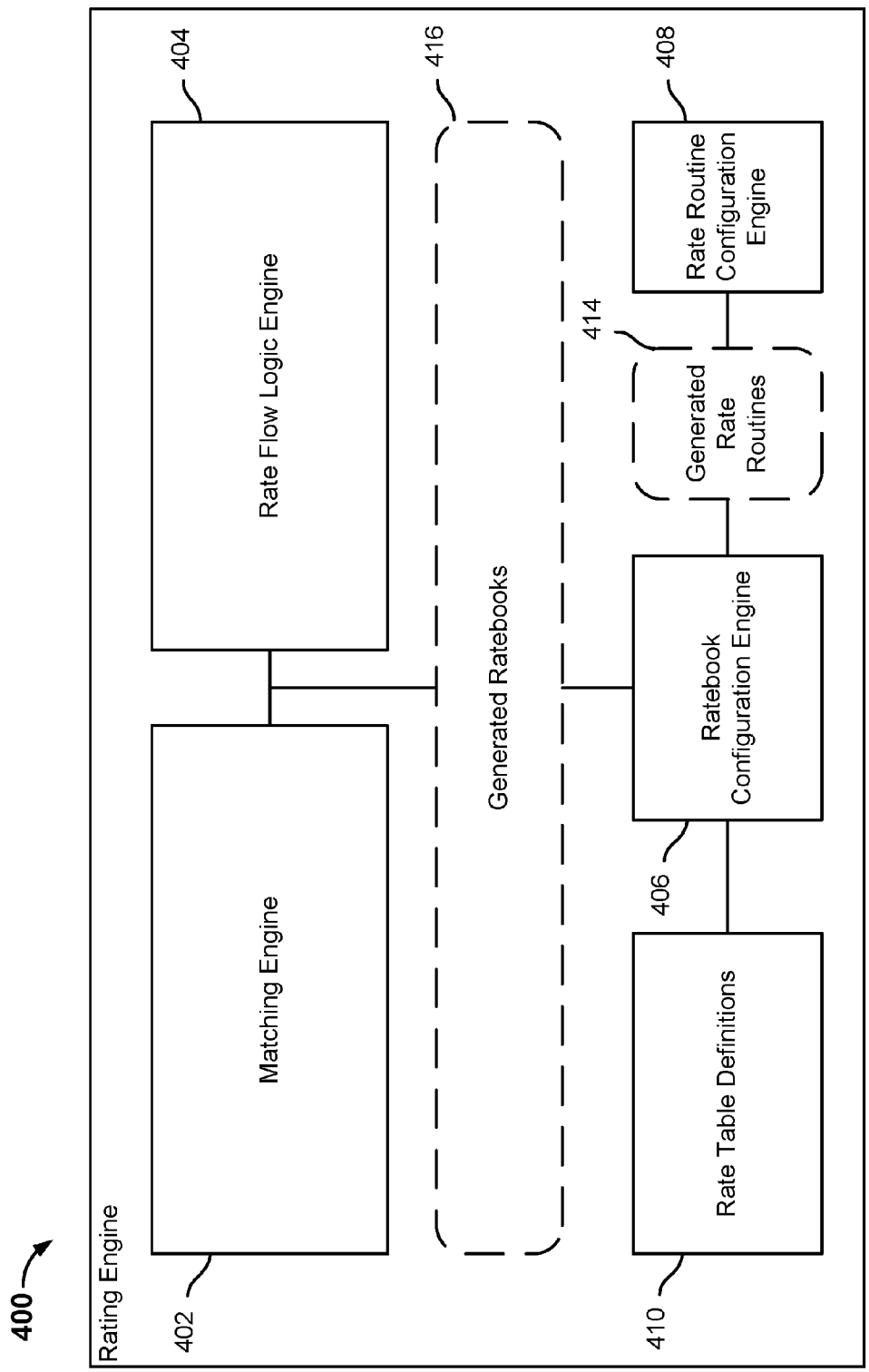
FIG. 4 is a block diagram illustrating an embodiment of a rating engine.

FIG. 4 is a block diagram illustrating an embodiment of a rating engine. In some embodiments, rating engine 400 is an example of rating engine 208 in FIG. 2. In the example shown, rating engine 400 includes matching engine 402, rate flow logic engine 404, ratebook configuration engine 406, rate routine configuration engine 408, and rate table definitions 410.

Matching engine 402 is configured to match an appropriate composite ratebook to a policy to be quoted. In some embodiments, matching includes selecting the appropriate composite ratebook from a set of pre-configured candidate composite ratebooks, such as ratebooks 416 generated by ratebook configuration engine 406.

In some embodiments, rate flow logic engine/module/component 404 is configured to generate quotes for coverages included in a policy. In some embodiments, the quote is generated based on the context of the quote, such as the characteristics of the policy and a previously selected ratebook matching the policy to be quoted. In some embodiments, rate flow logic engine 404 includes sequencing and execution logic for processing a quote, including identifying coverages in a policy, executing, in the appropriate order, the appropriate rate routines included in a matched ratebook to calculate premiums for the identified coverages, etc. The rate flow logic will be described in more detail below.

In some embodiments, ratebook configuration engine 406 is configured to generate and/or configure composite ratebooks such as generated ratebooks 416. In some embodiments, generated composite ratebooks are stored in data storage units such as a database, flat file, or any other appropriate data storage.

In some embodiments, rate routine configuration engine 408 is configured to generate and/or configure rate routines such as generated rate routines 414. In some embodiments, generated rate routines are stored in data storage units such as a database, flat file, or any other appropriate data storage.

In some embodiments, rate table definitions 410 comprise definitions for instantiating and defining rate tables for ratebooks. In some embodiments, rate table definitions comprise functions that receive as input various insurance parameters and return as output appropriate insurance values and factors used to generate a quote.

The engines described above can be implemented as software components executing on one or more general purpose processors, as hardware such as programmable logic devices and/or Application Specific Integrated Circuits designed to perform certain functions or a combination thereof. In some embodiments, the engines can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present application. The engines may be implemented on a single device or distributed across multiple devices. The functions of the engines may be merged into one another or further split into multiple sub-engines.

Figure 5:
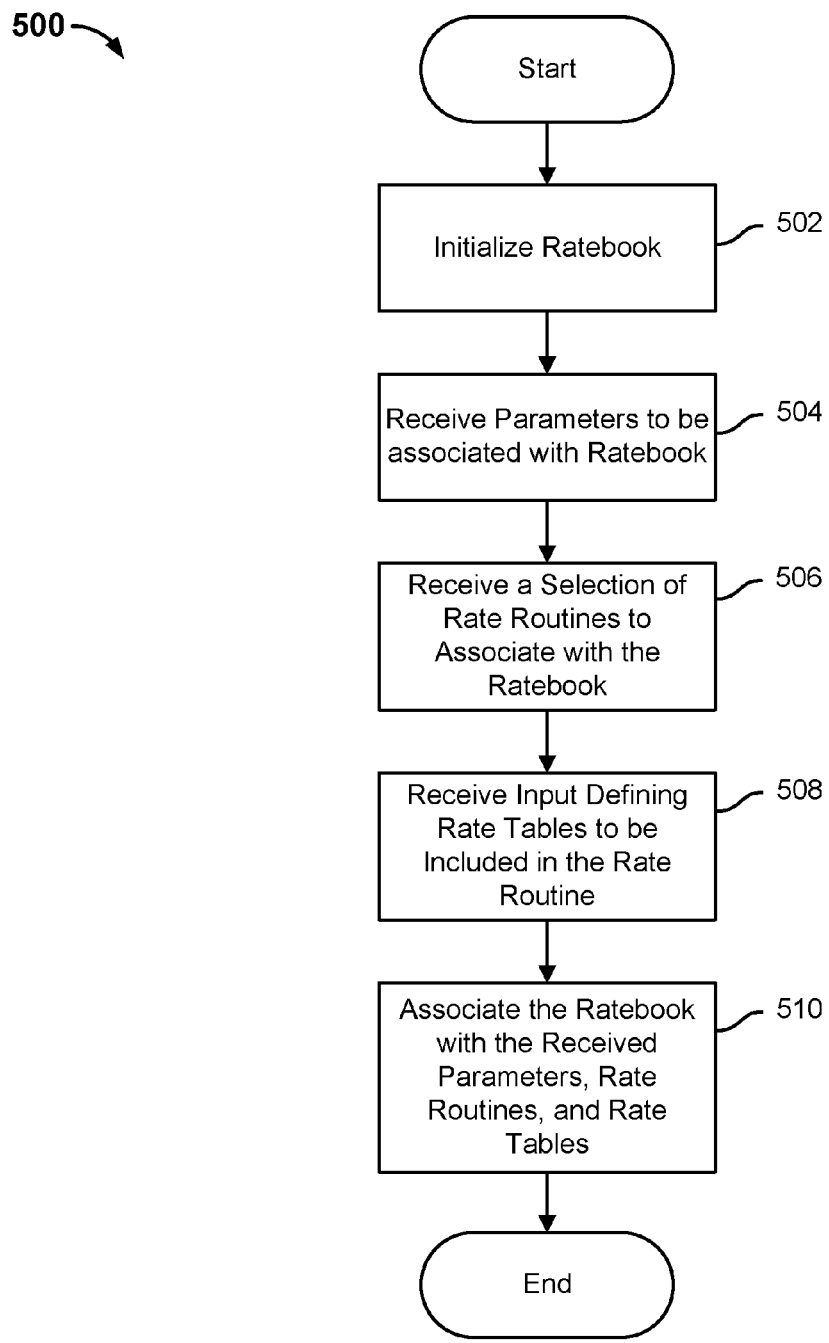
FIG. 5 is a flow diagram illustrating an embodiment of a process for configuring a composite ratebook.

FIG. 5 is a flow diagram illustrating an embodiment of a process for configuring a composite ratebook. In some embodiments, process 500 of FIG. 5 is executed by ratebook configuration engine 406 of FIG. 4. The process begins at 502 when a composite ratebook is initialized. In some embodiments, initialization includes creating a new composite ratebook (e.g., an object or a data structure) using a template. In some embodiments, initialization includes creating a new edition of an existing composite ratebook, for example, by generating a copy of the existing composite ratebook.

At 504, parameters associated with a ratebook to be configured are received. In some embodiments, the parameters are received via user input (e.g., inputted by an insurance agent) or are copied (e.g., copied from an existing ratebook when creating a new edition of the existing ratebook). In various embodiments, ratebook parameters/characteristics include code (e.g., string used by various programs and engines to identify and process the ratebook), name, edition, description, status, underwriting company, jurisdiction, policy line (line of business), offering, effective date, renewal effective date, expiration date, or any other appropriate parameter associated with a ratebook.

At 506, a selection of rate routines to be associated with the ratebook is received. In some embodiments, the associated rate routines are selected from a set of predetermined candidate rate routines. In some embodiments, a single rate routine is used to calculate the cost/premium of more than one coverage. In some embodiments, based on the received parameters, a filtered set of all candidate rate routines applicable to the ratebook are made available for selection. For example, if the ratebook is associated with a particular line of business, such as personal auto, only rate routines that are used to calculate premiums for coverages included under personal auto are made available for selection (e.g., presented, displayed, etc.), while rate routines for coverages for other lines of business (e.g., commercial property) are not made available.

At 508, an input defining rate table is received. In some embodiments, inputs from a user defining a rate table are received. For example, a user can specify which rate table definitions are required for instantiation as well as provide input used to populate the rate table instances. In some embodiments, input used to define rate tables includes user specified insurance values for the rate table, such as insurance factors. As described above, in some embodiments, rate table definitions indicate, for a rate table of a certain type/class (e.g., base rate), the number of lookup parameters (e.g., input arguments) and the type of value returned (e.g., numeric). In some embodiments, the actual values and insurance factors of a rate table instance can only be configured (e.g., populated) in the context of configuring a ratebook (e.g., rate table values are specific to a particular ratebook and do not exist outside the context of ratebooks).

In some embodiments, rate tables can be shared among ratebooks. For example, if the user has initialized a new edition or copy of a previous edition of a ratebook, the existing rate table of the previous ratebook edition can be referenced and shared between the new and previous ratebook editions (e.g., to save space by not having to instantiate multiple copies of the same rate table). However, in some embodiments, in the event that an indication is received that the user wishes to edit the shared rate table, an editable copy of the rate table is instantiated for the new edition, while the previously shared rate table is no longer shared. As the previous edition of the ratebook may already be activated and been used to calculate previous quotes, changing the values of the rate table (which can represent the state of certain insurance values at a particular point in time), can prevent previous quotes from being recreated. Thus, in some embodiments, the rate tables (and in some cases, rate routines and parameters) associated with activated ratebooks are locked and prevented from being editable.

At 510, the received parameters, selection of rate routines, and defined rate tables are associated with a composite ratebook. In some embodiments, the composite ratebook comprises a data object/entity that includes references to the specified parameters, rate routines, and rate tables. In some embodiments, the composite ratebook entity is included in a set of candidate ratebook entities and later selected for use in quoting an insurance policy.

Figure 6:
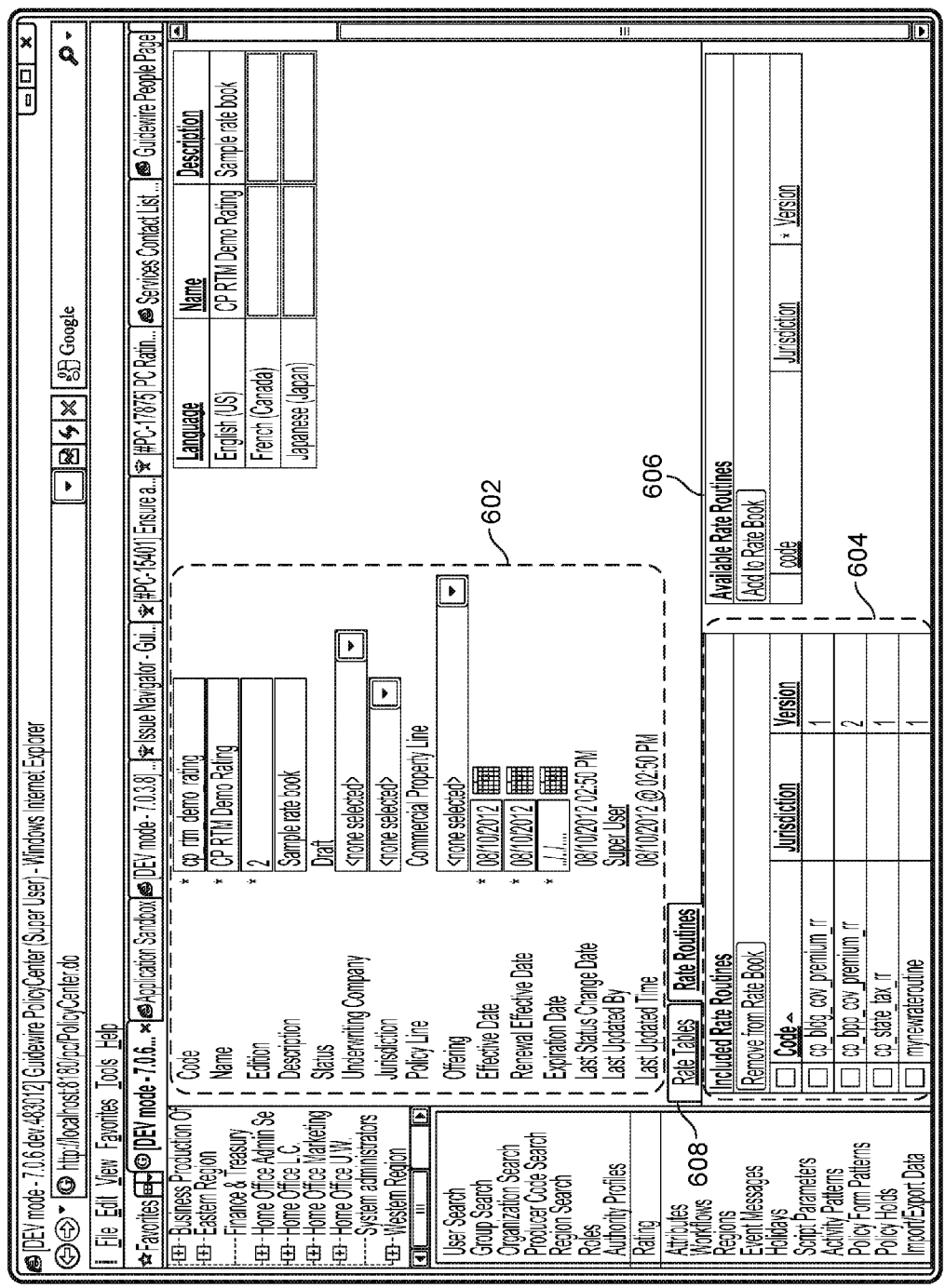
FIG. 6 is a diagram illustrating an embodiment of a composite ratebook editor user interface for configuring a composite ratebook.

FIG. 6 is a diagram illustrating an embodiment of a composite ratebook editor user interface used to configure a composite ratebook. In this example, various ratebook parameters can be configured at 602. In some embodiments, in the event that an existing ratebook is copied to create a new edition of the ratebook, a portion of the ratebook parameters may be pre-populated (e.g., with the parameters of the existing ratebook). At 604, rate routines included within the ratebook are shown. At 606, available rate routines (that are relevant to the ratebook based on its characteristics) can be presented or otherwise made available for selection. At 608, rate tables associated with the composite ratebook can be configured by a user.

Figure 7:
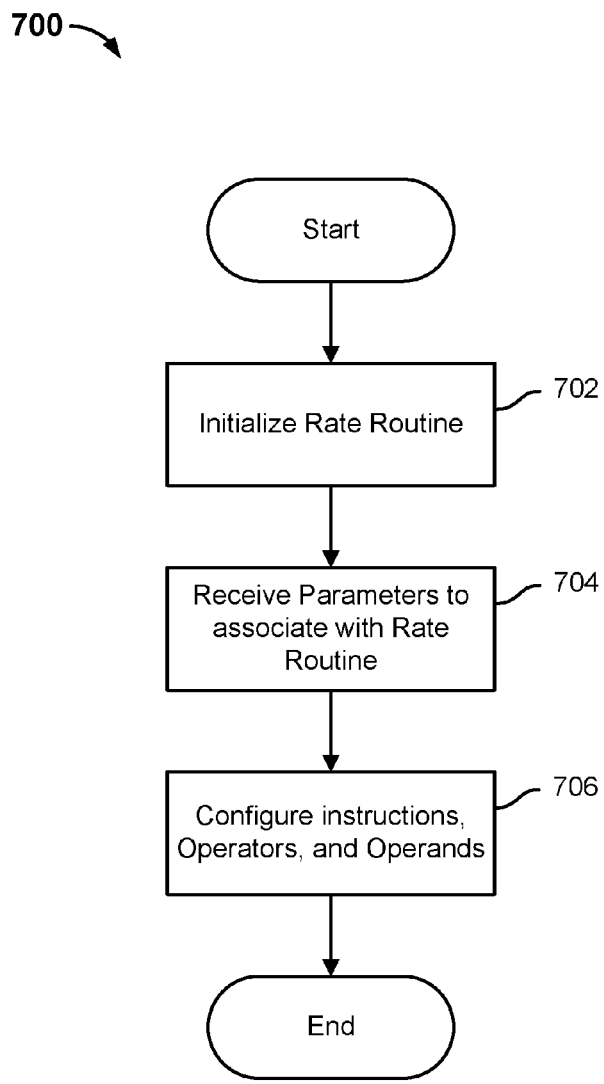
FIG. 7 is a flow diagram illustrating an embodiment of a process for configuring a rate routine.

FIG. 7 is a flow diagram illustrating an embodiment of a process for configuring a rate routine based on received user input. In some embodiments, process 700 of FIG. 7 is executed by rate routine configuration engine 408 of FIG. 4. In some embodiments, the input is received via a user interface presented to a user such as an actuary who is configuring the rate routine. The process begins at 702 when a rate routine is initialized, for example, when an input is received from a user indicating that a new rate routine (e.g., using a template) is to be created. In some embodiments, a new type or class of rate routine that previously did not exist can be created. In some embodiments, initialization includes creating a new version of an existing version of a rate routine of a particular type/class, for example, by generating a copy of the existing rate routine. In some embodiments, initializing a rate routine includes editing an existing rate routine or creating a variant for a jurisdiction.

In some embodiments, creating a new type/class of rate routine includes creating a template for the new type/class of rate routine. In some embodiments, this includes associating the new type/class of rate routine with a generic/common logical code name (e.g., used by processing code) for the new type/class, associating the new type/class of rate routine with one or more coverages for which the new type/class of rate routine will be used to generate a premium, etc. In some embodiments, creating a new type/class of rate routine includes specifying the number of inputs or variables to the new rate routine.

In contrast, in some embodiments, when creating a new version of an existing type/class of rate routine, configuration of the structure of the new version may be limited. For example, the new version may have the same number of variable inputs as the rate routine type/class upon which the new version is based. In some embodiments, the new version of the rate routine has the same generic name of the type/class of rate routine upon which it is based, but further includes a subidentifier indicating the version of the rate routine. In some embodiments, the subidentifier is numeric, a string, or any other appropriate subidentifier.

At 704, characteristics associated with the rate routine are received, for example, from a user. In various embodiments, characteristics associated with a rate routine to be configured include the code (e.g., string used by various programs and engines to identify and process the rate routine), name, jurisdiction, version, description, line of business, a parameter set indicating the scope of policy data required by the rate routine, or any other appropriate rate routine parameters.

In some embodiments, in the event that the new rate routine is a version of an existing rate routine that was created by copying the existing rate routine, a portion of the parameters may be pre-populated. For example, the name of the rate routine may be specified as the generic common name, code string, etc. of the type of base rate routine upon which the new rate routine is based. Additionally, the subidentifier can be automatically populated based on the number of existing versions of the type of rate routine. For example, if there were previously versions 1-3 of the type of rate routine, the new rate routine can automatically be specified as the 4th version of the rate routine. Additionally, in the event that the new rate routine is a version of an existing rate routine type, some fields and parameters may also be locked, such as the name, line of business, associated coverages, number of variables/input arguments, etc., to prevent the scope of the rate routine (e.g., coverages relevant to the rate routine) from being changed so that an incorrect premium is calculated.

At 706, configurations for instructions, operators, and operands of the rate routine are received. In some embodiments, instructions comprise operations used to perform various steps of the rate routine. The instructions may include multiple operations and steps. In some embodiments, configuring an instruction includes specifying a name of the instruction. In some embodiments, an instruction can include nested operations and may be specified using elements such as parentheses. In some embodiments, operators include mathematical operators, such as addition, subtraction, multiplication, division, etc. In some embodiments, operators include operators used to load and store/assign variables that will be used by the rate routine and to calculate a premium for a coverage. In some embodiments, operands are values used by instructions, operations, and operators. In some embodiments, the operands are configured to make calls to request values when performing the actual quoting process. The requests can be made for rate table values (e.g., base rate from base rate table, deductible factors, etc.) as well as for values associated with a policy being quoted, such as policy data.

In some embodiments, the results of the operations performed in an instruction (e.g., loading/assigning of variable, mathematical computation, etc.) are mapped/assigned to the instruction, and the instruction can be used as an operand for other instructions included in the rate routine. For example, a "base rate" instruction (such as that shown in FIG. 8) can be configured that loads a base rate value looked up in a base rate table and assigns it to the assignment instruction named "base rate." The "base rate" instruction, now mapped/assigned to a value, can then be used as an operand in other instructions, such as an "adjusted rate" instruction (also shown in FIG. 8), which may include multiple mathematical operations. In some embodiments, the received rate routine configuration characteristics and instructions specified by a user are used to generate a rate routine that can be archived for later use (e.g., selected by a user for inclusion in a ratebook, used to determine a coverage premium, etc.).

Figure 8:
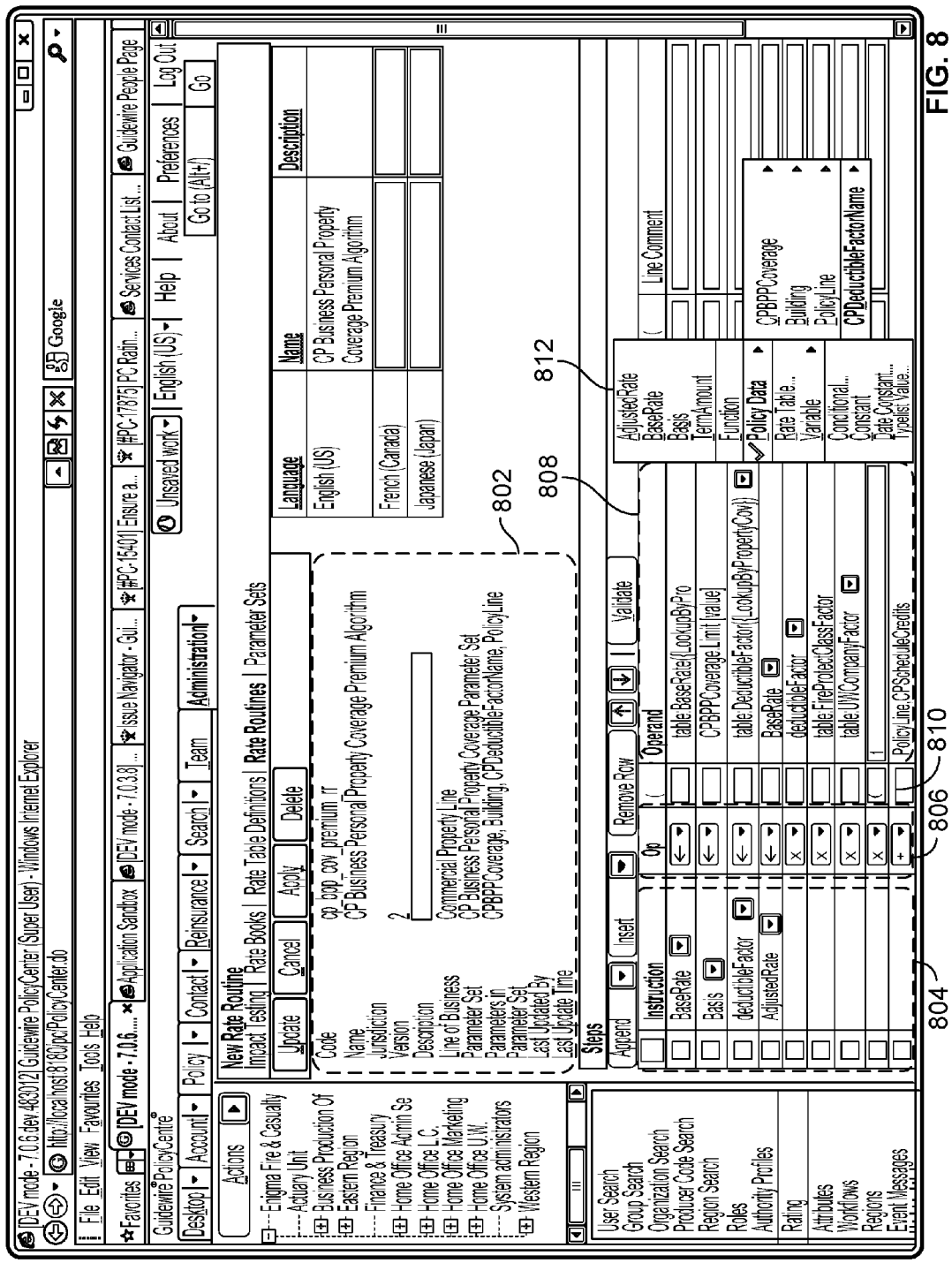
FIG. 8 is a diagram illustrating an embodiment of a rate routine editor interface for configuring a rate routine.

FIG. 8 is a diagram illustrating an embodiment of a rate routine editor interface for configuring a rate routine. In this example, various rate routine parameters can be configured at 802. In the example shown, the generic logical code string representing the type/class of the new rate routine is "cp_b-pp_cov_premium_rr," and the new rate routine is version 2 of this type/class of rate routine. Various instructions are shown at 804. As shown, each instruction may be associated with multiple steps of operations including operators (806) and operands (808). Parentheses (810) can also be specified to allow for nesting of operations. In the example shown, operands can be selected at 812 from various sources, such as existing instructions that have had values mapped to them (such as BaseRate, Basis), policy data, rate tables, etc. As shown, the sources can be automatically presented when configuring an operand, and available operands can be pre-filtered such that appropriate candidate operands are made available.

In the example shown, a user has specified four instructions, with different names, namely, "BaseRate," "Basis," "deductibleFactor," and "AdjustedRate." A user can specify a new instruction with any name. For a particular instruction, the user can then specify the various steps included in the instruction, which can include assignment operations, as well as mathematical operations. For each operator, the user can also specify the operands. The "AdjustedRate" instruction shows a configured multi-step instruction that includes loading a previous instruction "BaseRate" which has been mapped to a value requested from a base rate table, multiplied by various operands from various sources. In this example, operators and operands are specified one line at a time. Other user interface schemes are possible.

Figure 9:
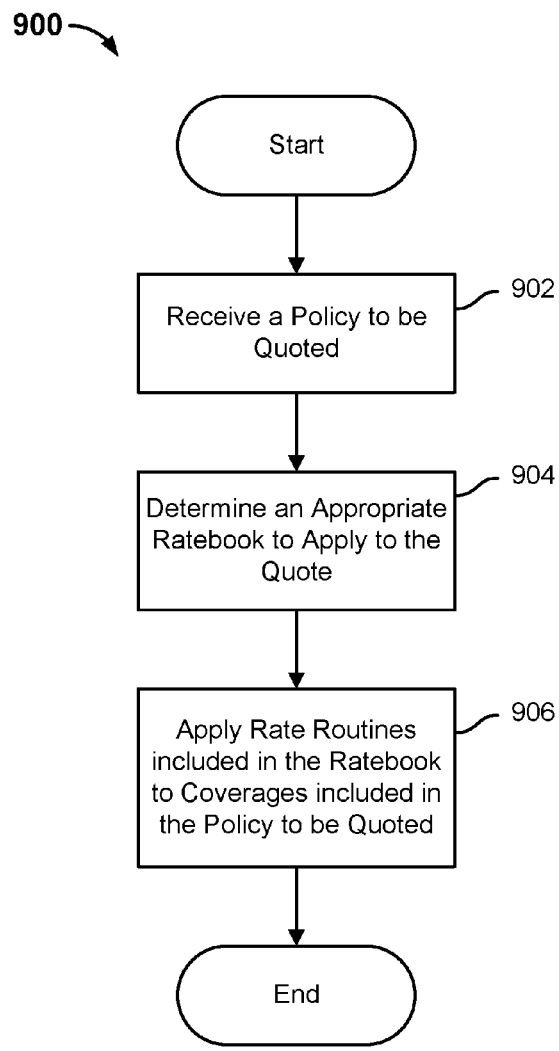
FIG. 9 is a flow diagram illustrating an embodiment of a process for generating a quote for a policy.

FIG. 9 is a flow diagram illustrating an embodiment of a process for generating a quote for a policy. In some embodiments, process 900 of FIG. 9 is executed by matching engine 402 and rate flow logic engine 404 of FIG. 4. The process begins at 902 when a policy to be quoted is received. In some embodiments, the policy to be quoted is part of a policy transaction (e.g., insurance agent requests for a quote to be done on a new policy). The policy transaction can also include other policy information such as account information that is global to the insurance products (e.g., insurance policies) being sold, but may be used when determining a quote for an insurance policy. For example, policy transaction information can include the names, addresses, ages, etc. of people associated with an insurance policy.

At 904, an appropriate ratebook to apply to the quote is determined. In some embodiments, determining the appropriate composite ratebook to apply to the quote includes matching an appropriate ratebook to the policy transaction, where the matched ratebook is selected from a set of candidate ratebooks. In some embodiments, the appropriate ratebook is automatically/dynamically determined in response to a request to quote an insurance policy.

In some embodiments, the appropriate/relevant ratebook is matched to the policy transaction based on the parameters and characteristics of both the policy transaction and the various candidate ratebooks. For example, for a policy to be quoted that is associated with a personal auto line of business, an effective date of Jan. 1, 2012, within a jurisdiction such as the state of California, and a particular underwriting company, a composite ratebook with matching characteristics can be identified and retrieved to use in quoting the policy transaction. In some embodiments, a comparison of characteristics of the policy to be quoted and various candidate ratebooks is performed to identify an appropriate matching ratebook. In some embodiments, matching rules are used to identify the appropriate ratebook for a policy transaction.

At 906, a rate routine included in the ratebook is applied to one or more coverages included in a policy to be quoted in order to calculate premiums for the one or more coverages, which will be described in more detail below.

Figure 10:
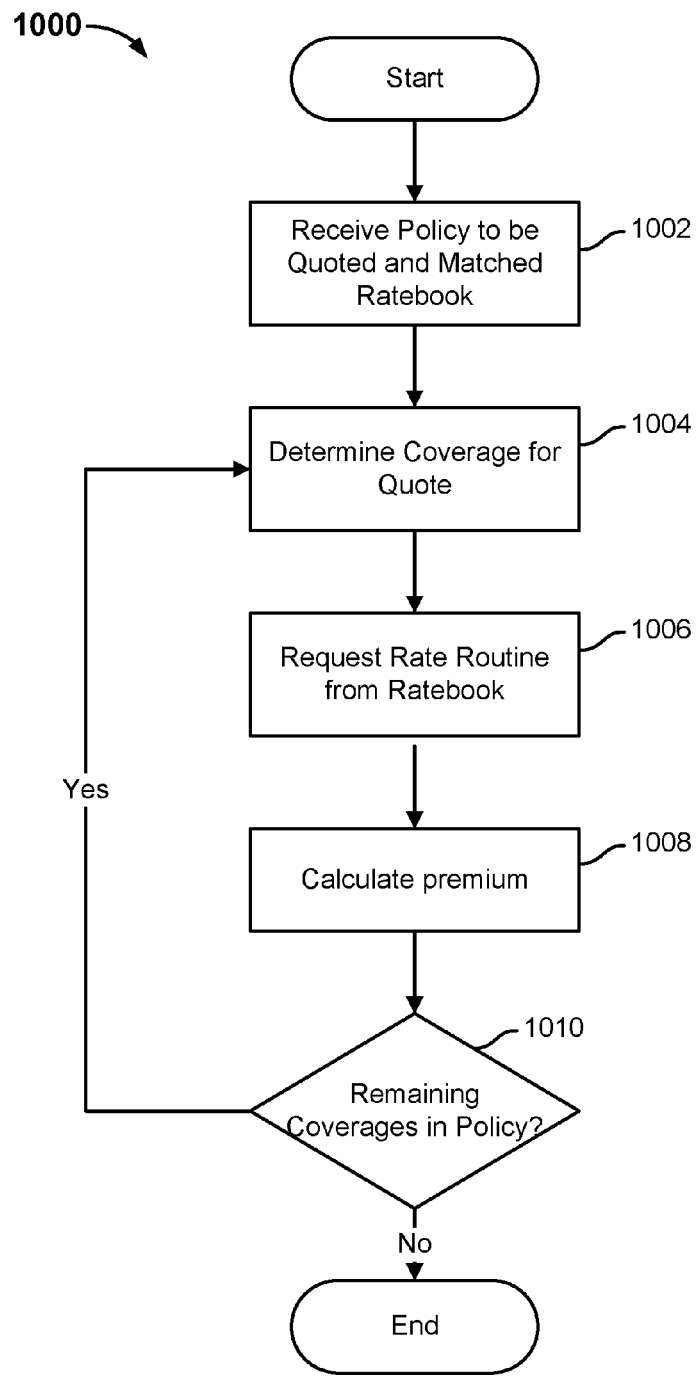
FIG. 10 is a flow diagram illustrating an embodiment of a process for applying a ratebook to a quote.

FIG. 10 is a flow diagram illustrating an embodiment of a process for applying a ratebook to a quote. In some embodiments, process 1000 of FIG. 10 is used to implement process step 906 of FIG. 9. In some embodiments, process 1000 of FIG. 10 is executed by rate flow logic engine 404 of FIG. 4. The process begins at 1002 when a policy to be quoted and a matching ratebook are received.

At 1004, coverages to be quoted are determined. In some embodiments, the coverages included on the policy to be quoted are identified by evaluating the policy to be quoted with respect to a set of candidate coverages. For example, a given line of business may be associated with a set of possible coverages for which premium calculations are to be executed in sequence. In some embodiments, a particular type/class of rate routine is specified to be used to determine a premium for a given coverage included in the set of candidate coverages. In some embodiments, each coverage in the set of candidate coverages is analyzed and it is determined whether the policy to be quoted includes the same coverage.

At 1006, a rate routine to calculate a premium for an identified coverage is requested. In some embodiments, in the event that the policy includes the coverage, the type of rate routine corresponding to the identified coverage is requested from the matched ratebook and executed. In some embodiments, a generic call for the type/class of the rate routine is made to the ratebook without specifying a particular version of rate routine. Because the matched ratebook will have been pre-configured to include the versions of the rate routines that are appropriate for quoting policies matching the characteristics of the selected ratebook, the rate flow logic code does not need to be aware of the particular versions and instances of rate routines that are required (e.g., logic does not need to know whether a CA or NY jurisdiction liability rate routine is used for the particular policy to be quoted), but is only required to specify the type/class of the rate routine for the type of coverage being determined (e.g., logic is only required to know that liability rate routine type/class is to be used). In this way, the rate flow logic code does not need to be modified to be aware of each new version of a rate routine, only of the various rate routine classes/types that are to be called for rating corresponding coverages. The context of the quote (e.g., characteristics of the quote, matched ratebook and associated combination of rate routines and defined rate tables) will determine ultimately what particular rate routine instances and rate table values are used in the rate calculation. This is an example of polymorphism.

At 1008, the premium for an identified coverage is calculated by applying the requested rate routine. The rate flow logic code includes execution code for executing the instructions previously configured for the requested rate routine.

At 1010 it is determined whether there are coverages remaining on the received policy for which premiums should be calculated. As described above, in some embodiments, the determination is performed by evaluating, in sequence, a list of possible, candidate rate routines under the line of business associated with the received policy to determine which of the candidate rate routines the received policy includes. In some embodiments, corresponding rate routine requesting, and premium calculation for an identified coverage are performed as the coverage is identified. In the example shown, the process continues until premiums for all coverages included in the received policy are determined. A quote can then be generated for the received policy and returned (e.g., to the insurance agent requesting the policy transaction).

Figure 11:
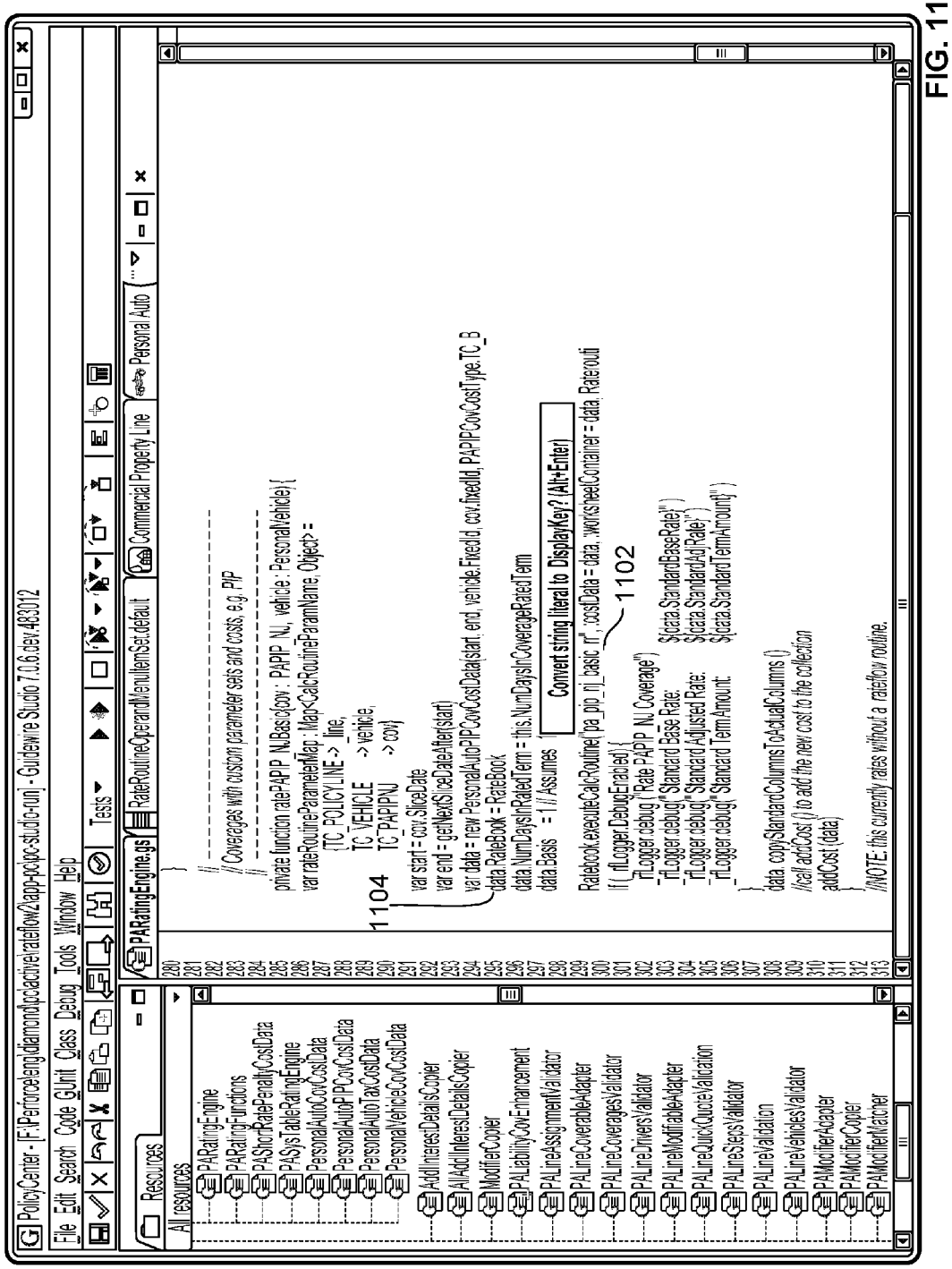
FIG. 11 is a diagram illustrating an embodiment of rate flow logic code used to calculate premiums for coverages on a policy to be quoted.

FIG. 11 is a diagram illustrating an embodiment of rate flow code used to calculate premiums for coverages on a policy to be quoted. In the example shown, at 1102, the rate routine class/type associated with the string code "pa_pip_n-j_basic_rr" has been requested from the ratebook (1104) that has been passed in to the rate flow logic. As shown, the rate flow logic code does not need to know the version of the rate routine type to call (e.g., v1, v2, etc.), but is only required to specify the type/class of the rate routine. Therefore, when a new version of the rate routine is created, the rate flow logic does not need to be modified to include the new rate routine version. The ratebook that has been passed to the rate flow logic, which has already been matched to a policy to be quoted, will include the appropriate collection/grouping of rate routines and defined rate table values for the particular policy. Additionally, as a ratebook is passed in to the rate flow logic as an input and is mapped to a local variable, the rate flow logic can make a generic call to its local ratebook variable to request rate routines without requiring knowledge of the actual edition of the ratebook. Similarly to when new versions of rate routines are generated, the rate flow logic code is not required to be modified when a new edition of a ratebook is created.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
 a set of one or more interfaces configured to:
  receive configuration parameters to be associated with a composite ratebook;
  obtain a set of candidate rate routines, wherein a rate routine includes operations used to determine a premium for an insurance coverage;
  determine a subset of the candidate rate routines to present, wherein the subset is determined at least in part by filtering the candidate rate routines according to the received configuration parameters;
  cause the determined subset of the candidate rate routines to be presented;
  receive a selection of one or more of the presented rate routines to be associated with the composite ratebook; and
  receive input defining one or more rate tables to be included in the composite ratebook, wherein the one or more rate tables include insurance factors used by the one or more selected rate routines to determine premiums for insurance coverages;
 a set of one or more processors:
  associate the composite ratebook with the configuration parameters received via the set of one or more interfaces, the selected one or more rate routines, and the defined one or more rate tables, wherein a different composite ratebook is associated with a different set of configuration parameters, selected rate routines, and defined rate tables; and
  store the composite ratebook in a set of candidate ratebooks, wherein a rate table is shared between the composite ratebook and the different composite ratebook, wherein the shared rate table is stored in one of the composite ratebook and the different composite ratebook and referenced by the other such that an additional copy of the shared rate table is not required to be instantiated and an amount of storage space required to store both the composite ratebook and the different composite ratebook is reduced; and
 a memory coupled to the set of one or more processors and configured to provide the set of one or more processors with instructions.

2. The system of claim 1, wherein the set of one or more processors is further configured to receive a request to quote an insurance policy.

3. The system of claim 2, wherein the set of one or more processors is further configured to select the composite ratebook as an appropriate edition of a composite ratebook to apply to the insurance policy to be quoted based at least in part on a context of the request.

4. The system of claim 3, wherein the composite ratebook was selected from the set of candidate composite ratebooks.

5. The system of claim 3, wherein selecting the composite ratebook includes matching the selected ratebook to the insurance policy to be quoted based on the context of the request.

6. The system of claim 5, wherein the context of the request includes policy information associated with the insurance policy to be quoted and parameters associated with the selected composite ratebook.

7. The system of claim 3, wherein the set of one or more processors is further configured to identify a coverage included in the insurance policy.

8. The system of claim 7, wherein the set of one or more processors is further configured to request, from the appropriate edition of the composite ratebook, a type of rate routine corresponding to the identified coverage.

9. The system of claim 8, wherein the set of one or more interfaces is further configured to receive an appropriate version of the requested type of rate routine.

10. The system of claim 9, wherein the request for the type of rate routine from the composite ratebook comprises a generic request for the type of corresponding rate routine, and wherein the appropriate version of the rate routine is received without the request specifying the appropriate version of the rate routine to be applied to the identified coverage.

11. The system of claim 9, wherein the set of one or more processors is further configured to determine a premium associated with the identified coverage at least in part by applying the received rate routine.

12. The system of claim 1 wherein the composite ratebook comprises a data entity that includes:
    a reference to a rate routine in the selected one or more rate routines; and
    an instance of a rate table in the defined one or more rate tables.

13. A method, comprising: receiving, via a set of one or more interfaces, configuration parameters to be associated with a composite ratebook;
    obtaining a set of candidate rate routines, wherein a rate routine includes operations used to determine a premium for an insurance coverage;
    determining a subset of the candidate rate routines to present, wherein the subset is determined at least in part by filtering the candidate rate routines according to the received configuration parameters;
    causing the determined subset of the candidate rate routines to be presented;
    receiving, via the set of one or more interfaces, a selection of one or more of the presented rate routines to be associated with the composite ratebook;
    receiving, via the set of one or more interfaces, input defining one or more rate tables to be included in the composite ratebook, wherein the one or more rate tables include insurance factors used by the one or more selected rate routines to determine premiums for insurance coverages;
    associating, using a set of one or more processors, the composite ratebook with the configuration parameters received via the set of one or more interfaces, the selected one or more rate routines, and the defined one or more rate tables, wherein a different composite ratebook is associated with a different set of configuration parameters, selected rate routines, and defined rate tables;
    and storing, using the set of one or more processors, the composite ratebook in a set of candidate ratebooks, wherein a rate table is shared between the composite ratebook and the different composite ratebook, wherein the shared rate table is stored in one of the composite ratebook and the different composite ratebook and referenced by the other such that an additional copy of the shared rate table is not required to be instantiated and an amount of storage space required to store both the composite ratebook and the different composite ratebook is reduced.

14. The method of claim 13, further comprising receiving a request to quote an insurance policy.

15. The method of claim 14, further comprising selecting the composite ratebook as an appropriate edition of a composite ratebook to apply to the insurance policy to be quoted based at least in part on a context of the request.

16. The method of claim 15, wherein selecting the composite ratebook includes matching the selected ratebook based on the context of the request.

17. The method of claim 16, wherein the context of the request includes policy information associated with the insurance policy to be quoted and parameters associated with the selected composite ratebook.

18. The method of claim 15, further comprising requesting, from the appropriate edition of the composite ratebook, a type of rate routine corresponding to an identified coverage.

19. The method of claim 18, further comprising receiving an appropriate version of the requested type of rate routine.

20. The method of claim 19, wherein the request for the type of rate routine from the composite ratebook comprises a generic request for the type of corresponding rate routine, and wherein the appropriate version of the rate routine is received without the request specifying the appropriate version of the rate routine to be applied to the identified coverage.

21. The method of claim 19, further comprising determining a premium associated the identified coverage at least in part by applying the received rate routine.

22. A computer program product, the computer program product being embodied in a tangible computer readable storage medium and comprising computer instructions for:
    receiving, via a set of one or more interfaces, configuration parameters to be associated with a composite ratebook;
    obtaining a set of candidate rate routines, wherein a rate routine includes operations used to determine a premium for an insurance coverage;
    determining a subset of the candidate rate routines to present, wherein the subset is determined at least in part by filtering the candidate rate routines according to the received configuration parameters;
    causing the determined subset of the candidate rate routines to be presented;
    receiving, via the set of one or more interfaces, a selection of one or more of the presented rate routines to be associated with the composite ratebook;
    receiving, via the set of one or more interfaces, input defining one or more rate tables to be included in the composite ratebook, wherein the one or more rate tables include insurance factors used by the one or more selected rate routines to determine premiums for insurance coverages;
    associating, using a set of one or more processors, the composite ratebook with the configuration parameters received via the set of one or more interfaces, the selected one or more rate routines, and the defined one or more rate tables, wherein a different composite ratebook is associated with a different set of configuration parameters, selected rate routines, and defined rate tables; and
    storing, using the set of one or more processors, the composite ratebook in a set of candidate ratebooks, wherein a rate table is shared between the composite ratebook and the different composite ratebook, wherein the shared rate table is stored in one of the composite ratebook and the different composite ratebook and referenced by the other such that an additional copy of the shared rate table is not required to be instantiated and an amount of storage space required to store both the composite ratebook and the different composite ratebook is reduced.

\* \* \* \* \*